United States Patent Office 3,438,640
Patented Apr. 15, 1969

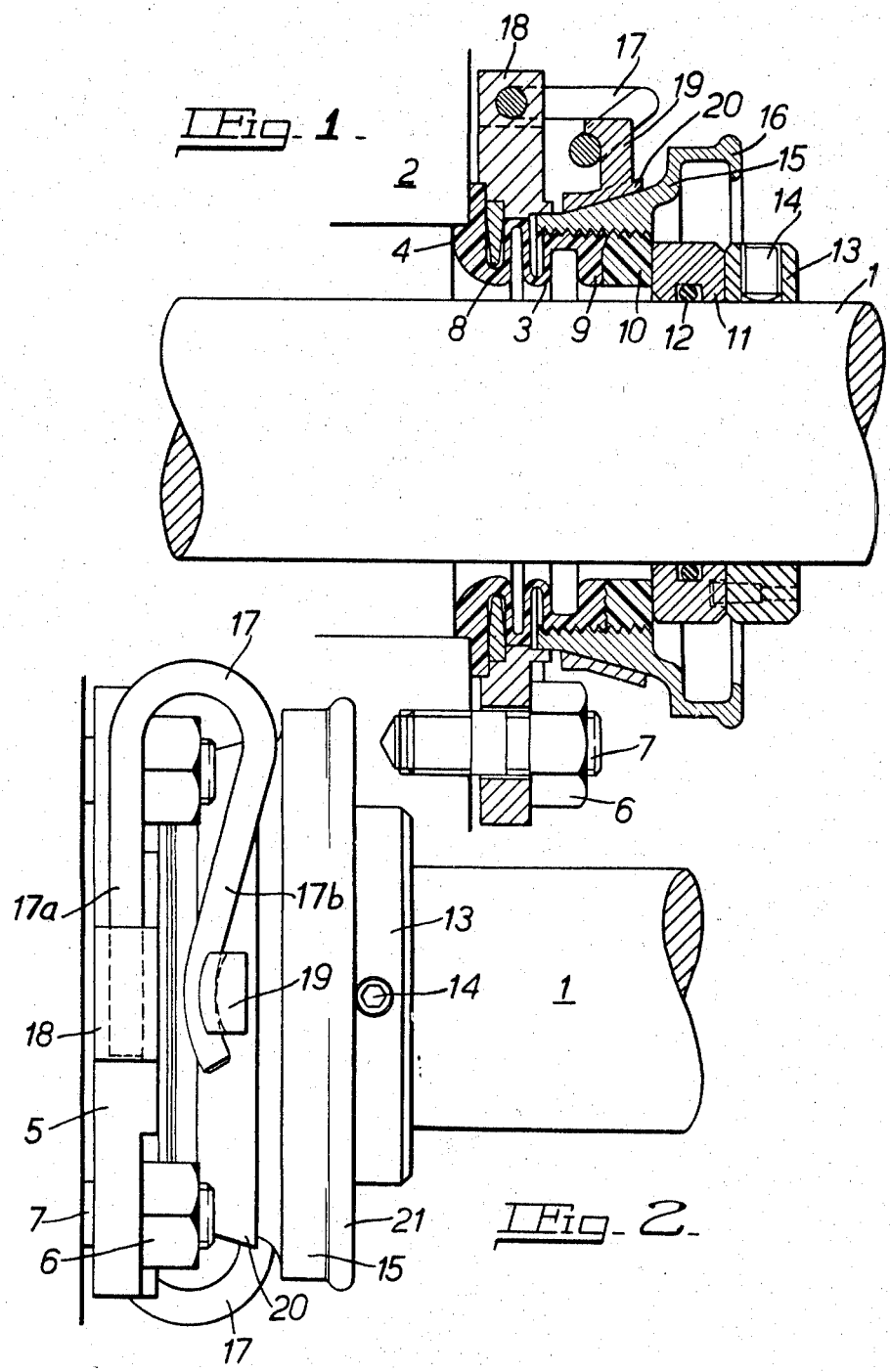

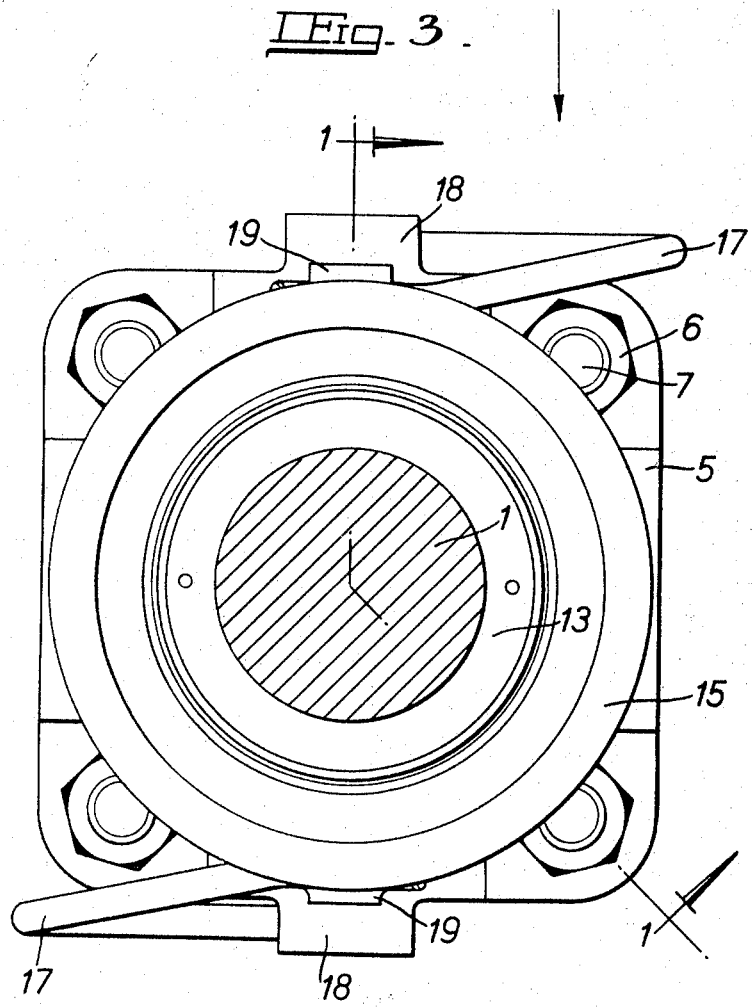

3,438,640
ROTARY MECHANICAL SEALS
Samuel C. W. Wilkinson, Cookham, England, assignor to Crane Packing Limited, Slough, Buckinghamshire, England, a British company
Filed July 15, 1966, Ser. No. 565,602
Claims priority, application Great Britain, July 27, 1965, 31,921/65
Int. Cl. F16j 15/34
U.S. Cl. 277—88                                8 Claims

ABSTRACT OF THE DISCLOSURE

In a rotary mechanical face seal in place of the usual single helical coil spring, coaxial with the seal or the usual array of small coil springs placed on a pitch circle, at least two hairpin-like springs are used to provide the axial thrust, the limbs of the hairpins preferably extending tangentially. One limb bears against a shroud that embraces the axially movable seal face member. Where this member is sealed to its associated part by bellows the shroud may enclose the bellows completely and may form a connecting sleeve between the bellows and the seal face member.

---

This invention relates to rotary mechanical face seals such as are used for sealing shafts into housings, for example the shaft of a liquid pump. These comprise two seal face members in mutual rubbing contact, one associated with the housing or other stationary part and the other with the shaft or other rotating member, and one of the members is axially fixed, while the other is axially movable and is usually urged towards the first-mentioned member by spring means. The axially movable member can be sealed to its associated part by bellows, or by a wedge seal, or by an O-ring, and in the known constructions the spring means can take the form of a number of helical coil compression springs spaced equally around a common pitch circle or it can be a single helical coil compression spring co-axial with the seal assembly.

The use of a single helical coil compression spring is convenient where the seal face member is sealed to its associated part by bellows, as the spring can be disposed around the bellows, and we have previously proposed to incorporate the spring in the bellows but this construction is expensive to produce and where the axially movable member is the rotating one of the spring can produce undesirable out-of-balance forces which make high-speed running impossible.

According to the invention we now propose a rotary mechanical face seal between relatively rotatable bodies in which an axially movable seal face member associated with one of the bodies is urged into mutual rubbing contact with an axially fixed seal face member associated with the other body, the first-mentioned seal face member being sealed to its associated body by axially flexible sealing means, in which the necessary axial force on the first-mentioned seal face member is provided by two or more bow-like or hairpin-like springs disposed outside the axially flexible sealing means at circumferentially spaced positions and acting between an axially fixed part and a shroud ring that encloses the first-mentioned seal face member and is detachable therefrom. Preferably the axially movable member is the non-rotating one, so that the springs are stationary and there are no troubles caused by out-of-balance forces.

Where the fluid against which the seal is acting is inside the bellows then, even where the fluid is a corrosive one, it is not necessary to provide any protective sheath over the springs. However, if such a sheath is required, the simple shape of the springs makes it easy to apply, for example by conventional spray-coating or powder-coating techniques. Even if the springs are exposed to a fluid which has a certain amount of corrosive action, it may be found unnecessary to sheath them since they can be replaced easily without dismantling the seal.

For compactness the springs are preferably arranged with their limbs extending substantially tangentially. There may be two such springs arranged diametrally opposite, with one limb of each spring received in a tangential hole in the housing or in a clamping plate that secures the bellows to the housing, and the other limb is made of slightly hooked shape and engages behind a trunnion-like lug on the thrust ring. The springs need not be of simple hairpin shape but could incorporate one or more complete turns, according to the stiffness required.

According to a further feature of the invention the thrust ring, or a ring on which it is mounted, can be in the form of a frusto-conical shroud embracing the seal, with its smaller-diameter end secured to the non-rotating seal face member. Preferably its smaller end is internally threaded so that it screws onto the externally threaded seal face member, and the adjacent end of the bellows, which may be of PTFE, can likewise be externally threaded to screw into the shroud. The shroud gives hoop strength to the seal face member and to the associated end of the bellows, and if the axial lengths of the parts are made such that the smaller end of the shroud actually enters a counterbore in the front face of the clamping ring it means that the bellows are fully enclosed and supported against bursting throughout their length.

Where the seal face member is separate from the bellows but both are screwed into the shroud, the latter forms a sleeve interconnecting the bellows and the seal face member and making it possible to do away with any other provision for sealing the bellows to the seal face member. This opens up the possibility of making the seal face member of a material incompatible with that of the bellows, for example tungsten carbide or ceramic. However, in the preferred construction the seal face member is of reinforced or filled plastic and is welded to the bellows or formed integrally with them anyway.

In a preferred construction the larger end of the shroud can have an inturned lip to form a splash guard that catches any slight seepage that may pass across the seal face.

The invention will now be further described by way of example with reference to the accompanying drawings, in which:

FIGURE 1 is an axial section through the seal on the line 1—1 in FIGURE 3;
FIGURE 2 is an external view, looking in the direction of the arrow in FIGURE 3; and
FIGURE 3 is an end elevation of the seal.

The seal illustrated serves to seal a rotatable shaft 1 into a housing 2, for example that of a pump. Bellows 3 made of a suitable flexible material, for example polytetrafluoroethylene, have an outwardly directed flange 4 at their rear end, by which the bellows 3 are clamped to the housing 2 by means of a clamping ring 5. This ring is held by nuts 6 on studs 7 screwed into the housing.

It will be seen that there is a support ring 8 located in a counterbore in the clamping ring 5, and this engages in the first concave convolution of the bellows. It helps to resist expansion of the bellows under the action of internal pressure and this is further helped by the fact that the clamping ring 5 is thick enough to enclose the first convex convolution as well.

The forward end 9 of the bellows is welded to a non-rotating seal face member 10 of reinforced plastics, for example of glass-filled polytetrafluoroethylene. The rotating seal face member, shown at 11, can be of known form, sealed to the shaft by an O-ring 12 and supported and driven by a driving ring 13 secured to the shaft 1 by a grubscrew 14.

The external surfaces of both the seal face member 10 and of the forward end 9 of the bellows are screw-threaded and a shroud 15 having a predominantly frusto-conical external shape is internally threaded and screws over both the end 9 of the bellows and the seal face member 10. This shroud may be of metal or of plastics, for example reinforced polytetrafluoroethylene. The tail end of the shroud is extended so that, at least when the seal face members are unworn, it enters and is located by a conterbore in the front face of the clamping ring 5. The forward end of the shroud is extended slightly beyond the plane of the mutually engaging rubbing faces of the two seal face member 10 and 11 and has a lip 16 on its free edge to form a splash guard and catch any slight seepage of fluid which may pass across the rubbing faces.

The axial sealing force is provided by a pair of hairpin-like springs 17 disposed outside the bellows 3 at diametrically opposite points and acting between lugs 18 on the clamping ring 5 and lugs 19 on a thrust ring 20 which fits over the tapered portion of the external surface of the shroud 15. One end 17a of each spring 17 is received in a tangentially directed bore in the lug 18 and the other end 17b is slightly hooked to engage against the face of the lug 19. The thrust ring may be of metal or of plastics.

It will be appreciated that the axial thrust of the two hairpin springs 17 is transmitted through the trunnion-like lugs 19 and the ring 20 to the shroud 15 and thence to the seal face member 10, urging into rubbing contact with the rotating seal face member 11. Instead of simply hairpin springs as shown, one could use springs having one or more complete turns between the ends to give the required spring rate. In contrast to known seal constructions the springs of the seal illustrated are extremely easy to remove and replace as it is necessary merely to spring one end 17b away from under the lug 19 and then slide the other end 17a out of the lug 18. None of the other components of the seal need be disturbed.

An important advantage of the construction illustrated, with the thrust taken through a shroud detachably screwed onto the axially movable seal face member 10, is that the seal can be assembled by first passing the clamping ring 5, which is an unbroken ring, over the bellows 3 and securing it to the housing 2, after which the thrust ring 20 and the shroud are subsequently fitted. This is what allows one to use bellows with an integral flange at their rear end for clamping and sealing purposes. The clamping ring 5 and the tail of the shroud 15 together form a sleeve-like enclosure over the whole of the bellows 3, enabling the bellows to resist substantial internal pressure without bursting.

In normal seals it is necessary to provide the seal face member, which is subject to considerable wear in the course of time, with a wearing protrusion forward of its carrier and this severely limits the pressure which the seal can withstand without the protrusion tending to distort or to mushroom outwards. In the construction according to the invention this limitation can be avoided because the wearing seal face insert 10 is fully supported within the shroud 15 and can be allowed to wear in a manner that forms a recess in the insert without any harm being caused.

I claim:
1. A rotary mechanical face seal between relatively rotatable bodies comprising a first annular seal face member associated with one of said bodies, said member being axially movable with respect to said body, axially flexible sealing means sealing said first member to said body, a second seal face member, said second member being associated with and sealed to said other body and being axially fixed, said seal face members being in mutual face-to-face rubbing contact over radial faces thereof, a shroud ring, said shroud ring enclosing said first seal face member and being detachable therefrom, spring means acting between a part associated with said first-mentioned body and a part associated with said shroud, wherein the improvement lies in the fact that said spring means comprise at least two bow-like springs, each of said springs having two substantially parallel limbs and lying outside said axially flexible sealing means, and each of said springs engaging through one of said limbs with a part associated with said first-mentioned body and through the other of said limbs with a part associated with said shroud.

2. A face seal as set forth in claim 1 wherein said axially flexible sealing means comprise bellows.

3. A face seal as set forth in claim 1 wherein said first-mentioned body comprises a housing and said other body comprising a shaft rotatable therein.

4. A face seal as set forth in claim 1 wherein each said spring is of hairpin shape and wherein said parts associated respectively with the first-mentioned body and with the shroud comprise lugs engaged by said limbs.

5. A face seal as set forth in claim 1 wherein said part associated with said shroud comprises a thrust ring fitting over said shroud.

6. A face seal as set forth in claim 1 wherein said axially flexible sealing means comprise bellows, and including an outwardly extending flange integral with said bellows, said part associated with the first-mentioned body comprising a clamping ring, said clamping ring being disposed to clamp said flange against said first-mentioned body.

7. A face seal as set forth in claim 1 wherein said first seal member has a screw-threaded engagement with said shroud.

8. A face seal as set forth in claim 1 wherein said first seal face member and also the adjacent part of said axially flexible sealing means are both externally screw-threaded, and wherein said shroud is internally screw-threaded and has a screw-threaded engagement both with said flexible sealing means and with said first seal face member.

References Cited

UNITED STATES PATENTS

| 2,015,515 | 9/1935 | Evans | 277—88 |
| 2,220,814 | 11/1940 | Erbach | 277—88 X |
| 2,752,176 | 6/1956 | Ayling | 277—87 X |
| 2,758,856 | 8/1956 | Payne et al. | 277—87 |
| 2,888,280 | 5/1959 | Meyer et al. | 277—88 X |

FOREIGN PATENTS 636,965  9/1934  Germany.

LAVERNE D. GEIGER, *Primay Examiner.*

JEFFREY S. MEDNICK, *Assistant Examiner.*

U.S. Cl. X.R.

277—92